United States Patent [19]

Grinde

[11] Patent Number: 4,531,293

[45] Date of Patent: Jul. 30, 1985

[54] GAUGE FOR INDICATING QUANTITY OF MIXTURE COMPONENTS TO BE ADDED TO A TANK

[76] Inventor: James E. Grinde, 2401 - 147th La. NE., Anoka, Minn. 55303

[21] Appl. No.: 576,746

[22] Filed: Feb. 3, 1984

[51] Int. Cl.³ .............................................. G01F 23/04
[52] U.S. Cl. .............................. 33/126.7 R; 73/290 B; 73/428; 116/227
[58] Field of Search ................ 33/126.4 R, 126.7 R, 33/126.7 A; 116/227; 73/290 B, 426–428

[56] References Cited

U.S. PATENT DOCUMENTS

| | | | |
|---|---|---|---|
| 1,716,334 | 6/1929 | Wilson | 33/126.7 R X |
| 1,774,439 | 8/1930 | Holtson | 33/126.7 R X |
| 1,857,334 | 5/1932 | Rubert | 33/126.7 R |
| 1,864,138 | 6/1932 | Machonis | 33/126.7 R |
| 2,027,494 | 1/1936 | Trabold | 73/428 |
| 2,029,345 | 2/1936 | Talbot | 33/126.7 R X |
| 2,039,965 | 5/1936 | Lees et al. | 33/126.7 R |
| 2,169,952 | 8/1939 | Holmes | 33/126.7 A |
| 3,006,314 | 10/1961 | Malec | 116/227 |
| 3,058,353 | 10/1962 | Irwin | 33/126.7 R |
| 3,291,495 | 12/1966 | Liebig | 277/174 X |
| 3,535,934 | 10/1970 | Rapata | 116/227 X |
| 4,294,273 | 10/1981 | Isberg | 33/126.4 R |

FOREIGN PATENT DOCUMENTS 587944 1/1959 Italy ............................... 33/126.7 R

*Primary Examiner*—Robert S. Ward
*Attorney, Agent, or Firm*—Orrin M. Haugen; Thomas J. Nikolai; Douglas L. Tschida

[57] ABSTRACT

A gauge for determining the relative proportions of materials to be added to a container to achieve a desired, predetermined mixture. More precisely, the gauge of the invention measures the level of the mixture remaining in the container and indicates the amount of at least one element of the mixture to be added to the tank before filling the tank with the other element of the mixture to achieve the desired ratio of elements when the tank is full. The gauge is comprised of a cap, gasket, and calibrated stick having a hinge member and retaining feet.

8 Claims, 4 Drawing Figures

U.S. Patent   Jul. 30, 1985   4,531,293
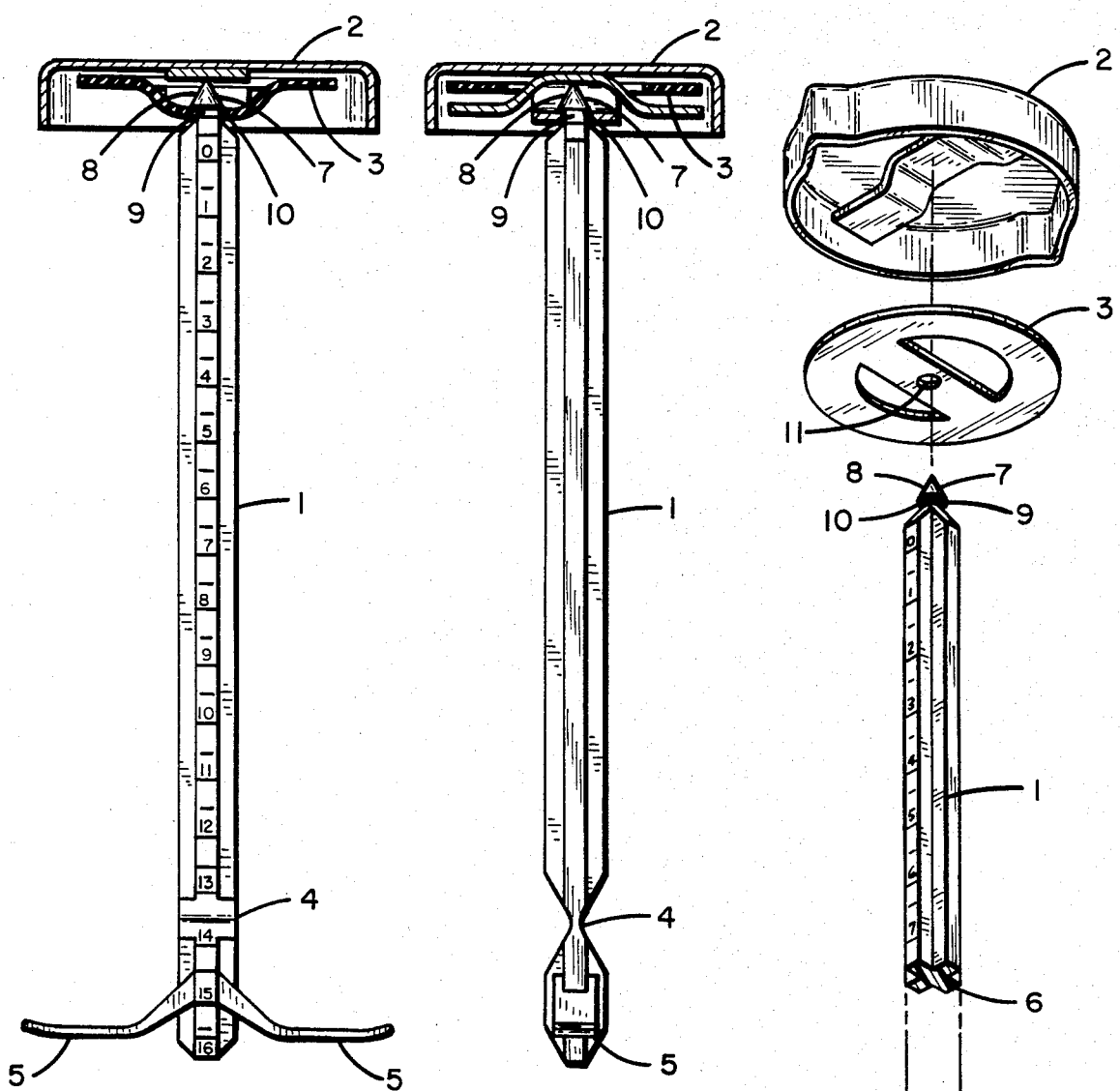
Fig. 1
Fig. 2
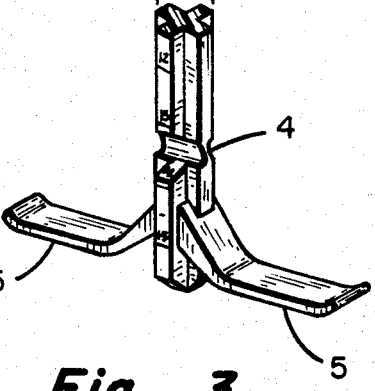
Fig. 3
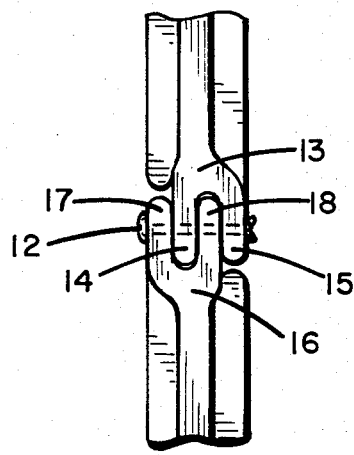
Fig. 4

4,531,293

GAUGE FOR INDICATING QUANTITY OF MIXTURE COMPONENTS TO BE ADDED TO A TANK

BACKGROUND OF THE INVENTION

It is often desirable to create a suitable mixture of two or more substances in a storage tank for later use. Common examples include: (1) mixtures of gas and oil for fuel to power the internal combustion engines of lawn mowers, snow blowers and boats; and (2) mixtures of water and fertilizers or poisons for agricultural uses. When a quantity of the mixture is all ready in the tank and it is desirable to have a completely full tank, it may be difficult to determine the amount of each material to be added to maintain the proper mixture. The present invention provides an easy, convenient manner for determining these amounts.

A gauge of the broad general type as that of the present invention is shown in the earlier Malec U.S. Pat. No. 3,006,314. This patent shows a gauge on a dip stick for determining the proper ratio of gas and oil to be added to completely fill a fuel tank with a mixture of the correct ratio. The gauge of Malec is dipped into the tank to determine the fluid level in the tank, and then read to determine how much oil to add before topping off the tank with gasoline. The Malec gauge, however, has two important disadvantages when compared to the present invention. First, it is not conveniently stored when not being used. Second, it is likely to become dirty between uses. Dirt can be washed off the Malec device into the mixture, destroying the purity of the mixture, and potentially clogging the fuel passages within the carburetor of engines.

SUMMARY OF THE INVENTION

The present invention comprises an inexpensive, durable gauge for determining the amount of at least one material to be added to a mixture before completing the filling of a container with another material to achieve the proper ratio of each material in the mixture. One end of the gauge is attached to the cover of the container so the gauge can be stored within the container. The other end of the gauge is fluted so that it cannot inadvertently be removed from the tank. Finally, the gauge is hinged along its length to facilitate the pouring of materials into the tank.

Various advantages and features of novelty which characterize the invention are pointed out with particularity in the claims annexed hereto and forming a part hereof. However, for a better understanding of the invention, its advantages, and the objects attained by its use, reference should be had to the drawings which form a further part hereof, and the accompanying descriptive matter, in which there are illustrated and described certain preferred embodiments of the invention.

DESCRIPTION OF THE DRAWINGS

Turning now to the drawings:

FIG. 1 shows a front view of the various parts of the gauge in this assembled relationship;

FIG. 2 shows a side view of the various parts of the gauge in their assembled relationship;

FIG. 3 shows the various parts of the gauge blown apart; and

FIG. 4 shows an alternative hinge for the gauge.

DESCRIPTION OF THE PREFERRED EMBODIMENT

As shown in the drawings, the gauge of the present invention is comprised of a calibrated stick 1, a cover or cap 2, a gasket 3, a hinge 4 and retainer feet 5.

Calibrated stick 1 can be made of nearly any material. However, it has been found that polyethylene plastic is perhaps most suitable because it is low in cost and does not interfere with the stability of most mixtures. Further, to ensure readability, it is suggested that the stick be given a dark mat finish and that the calibrations be embossed and colored white.

As indicated above, the stick has a series of calibrations spaced along it. The distance between the calibrations is determined by: (a) the shape of the container with which the gauge is to be used; (b) the volume of the container; and (c) the ratio of the materials in the desired mixture to be stored in the container. A separate set of calibrations, corresponding to the different substances in the mixtures, can be made on each side of stick 1.

Stick 1 is generally long and narrow having a cruciform cross-section as shown at 6. At the top of stick 1 is a barb 7 which is present for attaching stick 1 to cap 2 via gasket 3. The barb 7 has a conical or a pyramidal tip 8 and a cylindrical throat 9 which has a smaller circumference than the base 10 of the cone or pyramid shape tip 8.

Toward the bottom of stick 1 is a hinge 4. This hinge 4 can be coined or molded in the plastic as shown in FIG. 2 by thinning out the plastic in the area of the hinge. At the very bottom of stick 1 the plastic is fluted to provide one or more retaining feet 5. The function of the hinge 4 and feet 5 will be discussed in detail hereinbelow.

The cap 2 of the present invention is designed to cover the spout of the container with which the gauge is used. Cap 2 may be designed to screw onto the spout or to simply snap into place. In either event, the cap has an elastic gasket 3 to ensure a tight seal between the cap and the spout of the container. Near the center of gasket 3 is a hole 11 for receiving the barb 7 of the stick 1. This hole 11 has a diameter that is roughly the same or slightly larger than throat 9 of barb 7. Hole 11 is further defined as having a smaller circumference than the circumference of the base 10 of the cone or pyramid shaped tip 8 of barb 7. The gasket is thus used to maintain the stick 1 in assembled relation with the cap 2 which permits the gauge to be stored within the container even when not in use. Alternatively, the gauge rod can be suspended from the undersurface of the cap by means of a wire, one end of which is tied about cylindrical throat 9 and the other end being secured to a suitable point on the cap.

To use the gauge of the present invention, the cap 2 is simply removed from the spout of the container and the gauge is read by checking the fluid level on the stick 1. The calibration on the stick 1 at or near the fluid level will indicate how much of at least one material (such as oil) must be added to the mixture (such as gasoline and oil) already in the tank before the tank is topped off with another material (such as gasoline) to retain the proper ratio of materials (oil and gas) in the mixture.

The hinge 4 and feet 5 are present to aid in filling the container. The feet 5 retain at least the bottom of the gauge in the tank at all times and the hinge 4 allows one to get the cap 2 and the stick 1 out of the way so that there is no interference with pouring. The gauge, of course, can be completely removed from the container if desired, but the feet 5 prevent this from inadvertently being done.

FIG. 4 represents an alternative hinge arrangement comprised of a wrist pin 12, a first fork portion 13 having two prongs 14 and 15 which are integral with that portion of stick 1 above the hinge, and a second fork portion 16 having two prongs 17 and 18 which are integral with that portion of stick 1 below the hinge. A bore, not shown, is made through prongs 14, 15, 17 and 18 for receiving the wrist pin 12.

What is claimed is:

1. A gauge for use with a refillable tank of the type having a predetermined volume and having a tank filling opening closed by a removable cap, for determining the quantity of at least one mixture component to be added to a pre-existing quantity of mixture contained in said tank to ensure that the proper ratio of components is present when said tank is filled with another mixture component, comprising:
   (a) a stick member having first and second ends, said stick being wettable and calibrated to indicate the amount of at least one of said components to be added to said tank prior to completing filling of the tank with the other of said components;
   (b) said stick member having at least one foot member attached to said first end of said stick and projecting laterally outward therefrom to releasably retain said first end of said stick member within the tank and an attachment means at said second end of said stick member, said stick member being further divided into two portions joined together by hinging means disposed proximate said first end of said stick member; and
   (c) means associated with said attachment means for suspending the stick member from said cap so that said cap serves as a handle for said stick, said hinging means allowing said cap to be displaced a sufficient distance from said opening during filling of said tank without removing said first end of said stick member from said tank.

2. The gauge as in claim 1 wherein said stick member is molded from a plastic which is inert to said mixture and wherein said hinging means comprises a segment integrally molded with each said two portions which is sufficiently thin to be bendable without breaking.

3. The gauge as in claim 1 wherein said hinging means comprises a pin coupling said two portions together.

4. The gauge of claim 1 wherein said cap has a gasket for sealing said cap to said opening and wherein said attachment means includes a barb on the top of said stick member insertable into a hole in the center of said gasket.

5. The gauge of claim 4 wherein said barb has a cylindrical throat and a conical tip; said cylindrical throat having a smaller diameter than the base of the conical tip.

6. The gauge of claim 5 wherein the hole in the center of the gasket has a diameter larger than the throat of said barb but smaller than the base of the conical tip of said barb.

7. The gauge of claim 4 wherein said barb has a cylindrical throat and a pyramid shaped tip, said cylindrical throat having a circumference smaller than the circumference of the base of the tip.

8. The gauge of claim 7 wherein the hole in said gasket has a circumference larger than that of the throat of the barb but smaller than the base of the pyramid shaped tip.

* * * * *